United States Patent [19]
Berger et al.

[11] Patent Number: 5,767,023
[45] Date of Patent: Jun. 16, 1998

[54] PROCESS AND MACHINE FOR THE MANUFACTURE OF A COMPOSITE MATERIAL REINFORCED WITH A THREE-DIMENSIONAL CONTINUOUS FIBRE STRUCTURE AND COMPOSITE MATERIAL SO OBTAINED

[76] Inventors: Michel Berger, 104 La Lande - Sainte Hélène, 33480 Castelnau de Médoc; Claude Chauvelier, 6 route de Boutigny, Vayres-sur-Essonne- 91820 Boutigny, both of France

[21] Appl. No.: 640,723

[22] Filed: Mar. 22, 1996

Related U.S. Application Data

[63] Continuation of Ser. No. 211,214, filed as PCT/FR92/00884, Sep. 23, 1992, abandoned.

[30]         Foreign Application Priority Data

Sep. 24, 1991  [FR]  France ................................... 91 11768

[51] Int. Cl.$^6$ ...................................................... D03D 3/00
[52] U.S. Cl. ................. 442/205; 139/384 R; 139/420 R; 156/148
[58] Field of Search ..................... 442/205; 139/384 R, 139/420 R; 156/148

[56]                References Cited

U.S. PATENT DOCUMENTS 4,038,440  7/1977  King ........................................ 428/245

FOREIGN PATENT DOCUMENTS 0 166 631  2/1986  European Pat. Off. .
0 258 477  9/1988  European Pat. Off. .

OTHER PUBLICATIONS

JP 1 044 736—Patent Abstracts of Japan, 17 Feb. 1989.

*Primary Examiner*—James J. Bell
*Attorney, Agent, or Firm*—Bacon & Thomas

[57]                    ABSTRACT

Process and machine for the manufacture of a composite material reinforced with a three-dimensional continuous fiber structure. A fiber bundle is positioned in direction Z. A plate fitted with fiber guides holds the fibers apart. Fiber layers arranged alternately according to directions X and Y are formed between the fibers of the bundle. The fiber layers fabrics are carried by combs ($40a$ to $40d$) which are displaced in the Z direction and pivoted in order to bring the spacing between the fibers of a same fabric to layer p(X) and q(Y) corresponding to the desired structure. The fibers undergo impregnation during displacement of the combs.

17 Claims, 7 Drawing Sheets

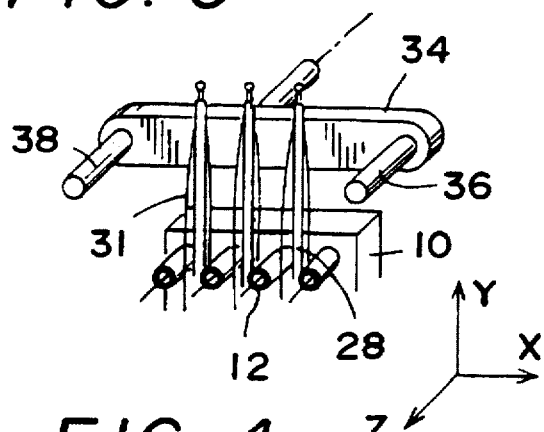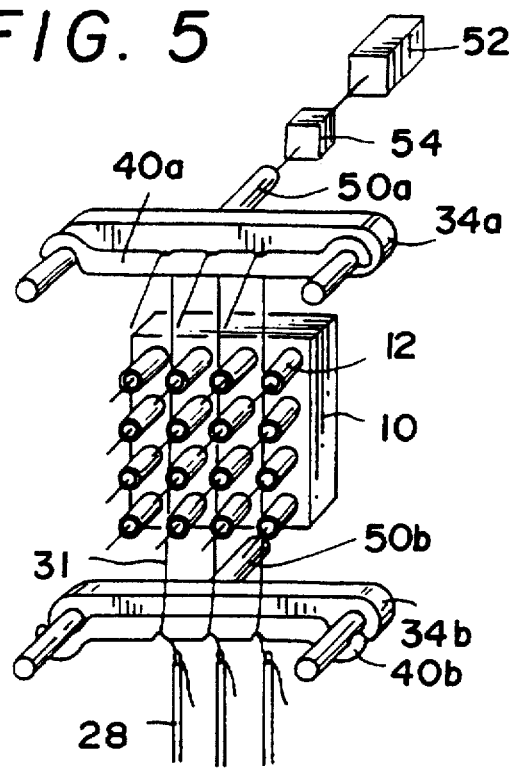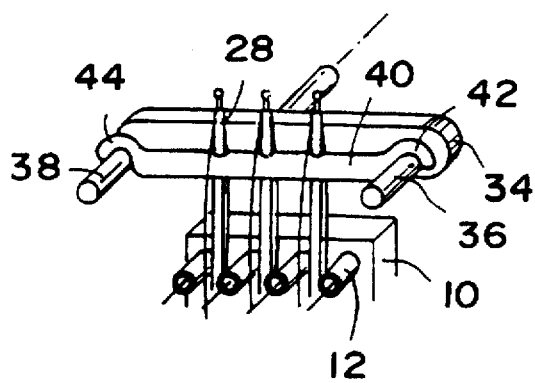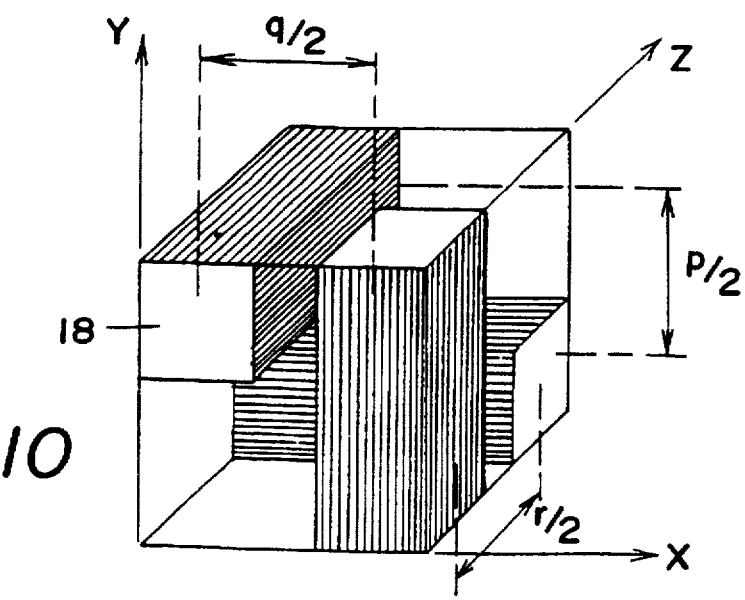

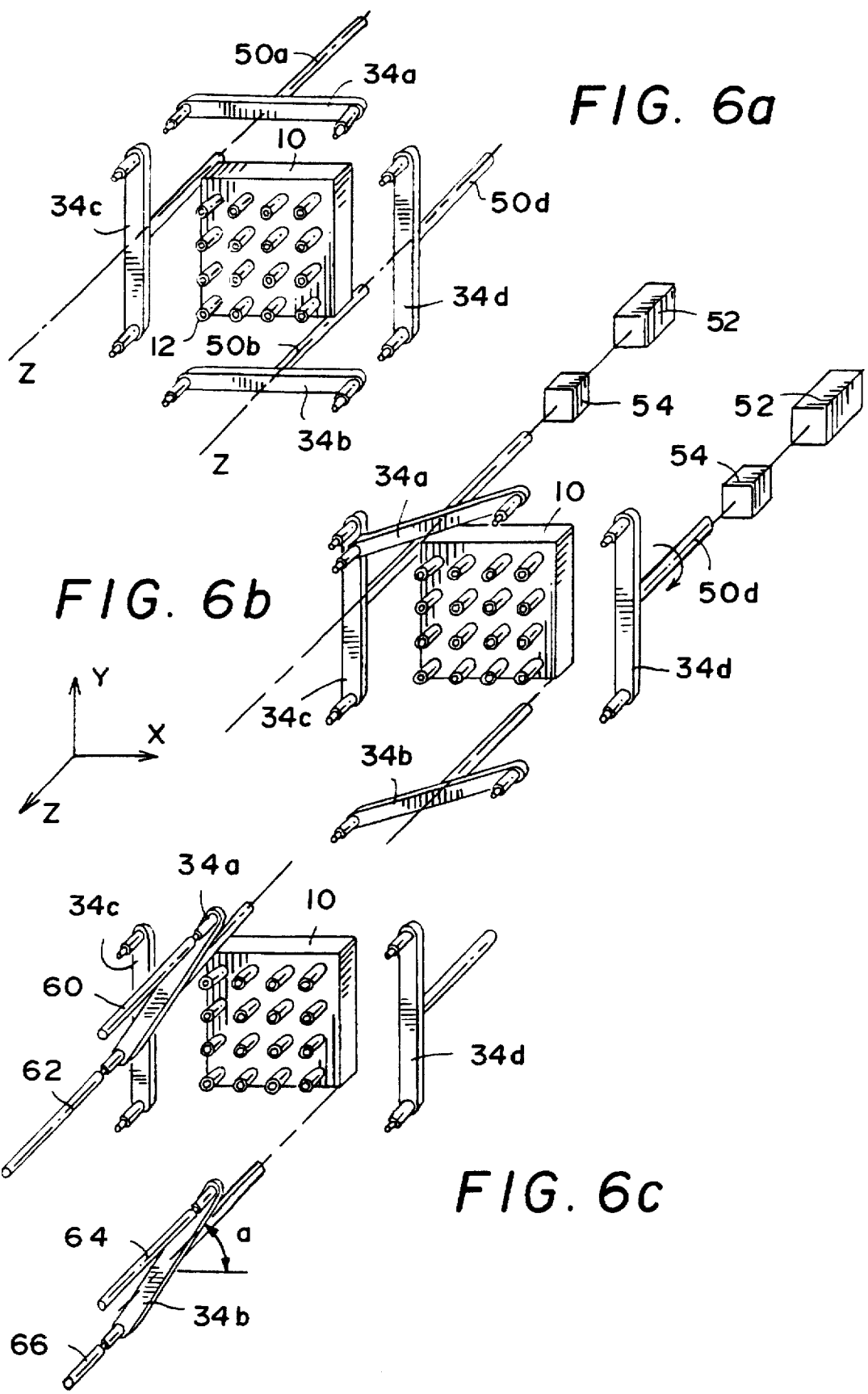

PROCESS AND MACHINE FOR THE MANUFACTURE OF A COMPOSITE MATERIAL REINFORCED WITH A THREE-DIMENSIONAL CONTINUOUS FIBRE STRUCTURE AND COMPOSITE MATERIAL SO OBTAINED

This application is a continuation of application Ser. No. 08/211,214, filed Mar. 24, 1994 now abandoned (International Patent Application No. PCT/FR92/00884 filed Sep. 23, 1992).

The present invention relates to a method of fabricating a composite material having a three-dimensional structure of continuous reinforcing fibers, to a machine for implementing such method, and to a composite material as obtained by implementing said method.

BACKGROUND OF THE INVENTION

It is known that composite materials are constituted by various kinds of reinforcing fiber dispersed within a matrix. The reinforcing fibers are organic or inorganic fibers such as nylon fibers, carbon fibers, glass fibers, silicon carbide fibers, boron fibers, etc. . . . The matrices used are themselves organic or inorganic, such as resin matrices, e.g. of polyester or of polyepoxy. The matrix may include various fillers, e.g. such as graphite powder, titanium powder, ceramic powder, etc.

Such materials are being used more and more frequently, however embodiments known in the past have a reinforcing fiber structure that is inadequate for use in many of the applications that could be envisaged.

In the past, composite materials with fiber reinforcement have generally been obtained by stacking thin layers of reinforcement in the form of cloth or of fiber sheets or of flattened roving, and bonding them together by means of resin. With such a structure, at best, force distribution may be isotropic in the stacking plane or in the stacking surface (molding to shape, winding of filaments, etc . . . ). All such materials are of the surface reinforcement type. There also exist special reinforcing cloths where fibers are disposed perpendicularly to the weaving plane, thus constituting a three-dimensional type of cloth. However, in that case, the quantity and/or the length of fibers extending perpendicularly to the stacking plane is never sufficient to obtain mechanical properties that are isotropic in all three dimensions.

Three-dimensional weaving methods can also be found enabling isotropic reinforcement to be obtained, i.e. reinforcement having mechanical properties that are substantially identical along three orthogonal coordinate axes. However, such reinforcing structures have a concentration of reinforcement relative to the entire composite that remains low overall, being less than 33%.

It can thus be seen that there exists a real need for composite materials having a reinforcing structure that presents firstly properties that are isotropic or that are capable of being isotropic, and secondly a concentration of fiber reinforcement that is substantially greater than 33%.

OBJECTS AND SUMMARY OF THE INVENTION

An object of the present invention is to provide a method and a machine for making a composite material that satisfies the above-specified conditions, i.e. capable of presenting mechanical strength that has very good isotropy, i.e. a regular disposition along the three coordinate axes with respect to the reinforcing fiber structure, and which additionally presents a concentration of reinforcement relative to the composite matrix that is substantially greater than 33%.

To achieve this object, the method of making a composite material having a three-dimensional structure of continuous reinforcing fibers, said fibers extending respectively along directions X, Y, and Z, where the direction Z is orthogonal to the directions X and Y, comprises the following steps:

a) a bundle of fibers is extended along the Z direction in such a manner that in a first plane parallel to the directions X and Y the fibers present pitches p' and q' between one another respectively in the X direction and the Y direction, and in a second plane also parallel to the X and Y directions and at a distance L from said first plane, they present pitches p and q respectively in the X direction and the Y direction that correspond to the desired reinforcing structure with p<p' and q<q', the fibers leaving passages between one and another in the X and Y directions, which passages taper from the first plane towards the second plane;

b) a substantially plane first sheet of fibers extending in the X direction parallel to the XY plane is put into place between the fibers of the bundle in the proximity of said first plane and occupying the X direction passages, the fibers of said sheet being spaced apart by a distance substantially equal to q', and all of said sheet is displaced over a distance L parallel to the Z direction towards said second plane while simultaneously progressively moving the fibers of said sheet towards one another in such a manner that at the end of said movement the spacing between the fibers of said sheet is substantially equal to q, and said spacing is held;

c) a substantially plane second sheet of fibers extending in the Y direction parallel to the XY plane is put into place between the fibers of the bundle in the proximity of said first plane and occupying the Y direction passages, the fibers of said sheet being spaced apart by a distance substantially equal to p', and all of said sheet is displaced over a distance L parallel to the Z direction towards said second plane while simultaneously progressively moving the fibers of the second sheet towards one another in such a manner that at the end of said movement the spacing between the fibers of the second sheet is substantially equal to p, said spacing is held, and the first sheet is displaced through a distance r/2 in the Z direction when the second sheet reaches the second plane; and d) the operations b and c are repeated alternately for the first and second sheets of fibers until a desired length is obtained in the Z direction, with the displacement over the distance L towards said second end of a first or second sheet of fibers being accompanied by displacement through r/2 in the Z direction of all of the sheets that precede it; said method further including a step of impregnating the sheets and the bundle of fibers by means of a thermosettable liquid, thereby obtaining a composite material having reinforcing fibers at pitches p, q and r.

It will be understood that by the method of the invention it is possible to obtain an isotropic structure of reinforcing fibers. The pitch of the bundle of fibers in the proximity of the first end is selected so that the pitches p' and q' are large enough to enable successive sheets of fibers to be put into place along the X and Y directions easily by means of needles. During the displacement of each of the sheets from the first end towards the second end, the fibers are caused simultaneously to move closer to one another, with such moving closer being continued until the spacing between the fibers of the sheet reaches the pitches p and q desired for the final reinforcing structure. Since this operation is performed both for the sheets of fibers in the X direction and for the sheets of fibers in the Y direction, an isotropic reinforcing structure is thus indeed obtained. In addition, by using appropriate values for the pitches p and q and for the distance r of the reinforcing structure, it is possible to obtain a concentration of isotropic reinforcement that is greater than 50% of the total volume of the composite material.

It will also be understood that by matching the values of the parameters p, q, and r to the nature of the fibers, and depending on the desired objective, it is possible to obtain a reinforcing structure that is completely isotropic or that has controllable anisotropy, and with this being obtained at a high final concentration of reinforcement.

According to the invention, the machine for making a composite material having a three-dimensional structure of reinforcing fibers, said fibers extending respectively along directions X, Y, and Z, where the direction Z is orthogonal to the directions X and Y, comprises:

first keeper means and second keeper means disposed as a distance L from the first keeper means, the keeper means serving to hold a bundle of fibers having an axis in the Z direction, the first keeper means defining respective pitches p' and q' in the X and Y directions for the fibers of the bundle and the second keeper means defining pitches p and q in the directions X and Y for the fibers of the bundle, where p'>p and q'>q, passages existing in the X and Y directions between the fibers of the bundle;

a plurality of first support means for putting a sheet of fibers into place in the proximity of said first keeper means in the X direction, extending in a plane parallel to X and Y, the fibers being spaced apart by a distance substantially equal to q' and being disposed in the Y passages;

a plurality of second support means for installing second sheets of fibers in the proximity of said first keeper means, the fibers being disposed in the Y direction in a plane parallel to X and Y, the fibers being spaced apart by a distance substantially equal to p';

first displacement means for displacing said first support means over a distance L in the Z direction from said first keeper means towards said second keeper means and for simultaneously causing the fibers of said first sheets to move towards one another in such a manner that at the end of their displacement, the distance between the fibers in the Y direction is substantially equal to q, and for holding the fibers of the sheet at said distance q;

second displacement means for displacing said second support means over a distance L in the Z direction from said first keeper means towards said second keeper means and for simultaneously causing the fibers of said first sheets to move towards one another in such a manner that at the end of their displacement, the distance between the fibers in the X direction is substantially equal to p, and for holding the fibers of the sheet at said distance q;

control means for alternately actuating said first and second displacement means and whenever the first or second means for displacement over the distance L come into action means for displacing said support means for the previously-displaced and held-together sheets along the Z direction through a distance r/2; and impregnation means for impregnating said fibers by means of thermosetting liquid.

In a preferred embodiment of the machine, the first keeper means comprise a plate parallel to the X,Y planes and provided with a plurality of cylindrical tubes having their axes extending along the Z direction, a bundle fiber passing through each tube, said tubes being disposed in the X and Y directions at the pitches p' and q', and said tubes projecting from said plates.

It will be understood that because of the presence of the tubes that project from the plate, the needles which are displaced along the X and Y directions are guided by the tubes. This makes it possible to install the successive sheets of fibers, which operation would give rise to major problems if the tubes were absent.

The present invention also provides a composite material constituted by a three-dimensional reinforcing fiber structure embedded in a matrix, wherein said fibers are substantially rectilinear and are disposed along directions X, Y, and Z, the direction Z being orthogonal to the directions X and Y, wherein said fibers extend over the entire distance through the composite material in the corresponding direction, and wherein the volume occupied by said fibers is not less than 33% of the total volume of the composite material; and preferably at least about 50%.

BRIEF DESCRIPTION OF THE DRAWINGS

Other characteristics and advantages of the invention appear more clearly on reading the following description of a preferred implementation of the invention given by way of non-limiting example. The description refers to the accompanying drawings, in which:

FIGS. 3, 4, and 5 show different steps in installing a sheet of fibers in the Y direction;

FIGS. 6a, 6b, and 6c show different steps in displacing a sheet of fibers in the Y direction;

FIG. 10 is a perspective view showing the basic reinforcing fiber structure obtained by implementing the invention;

MORE DETAILED DESCRIPTION

As already mentioned, the machine for making composite materials comprises: first installation means for putting a bundle of fibers into place generally along the Z direction; second installation means for putting sheets of fibers successively into place along the X and Y directions; displacement means for moving each sheet from a first end to a second end of the machine while causing the fibers within each sheet to move closer together; impregnation means for impregnating the fibers of the sheet while it is being moved; and keeper means for holding close together the fibers of the sheets that have successively been displaced towards the second end of the machine. The various portions of the machine are described below in succession.

Figure 1:
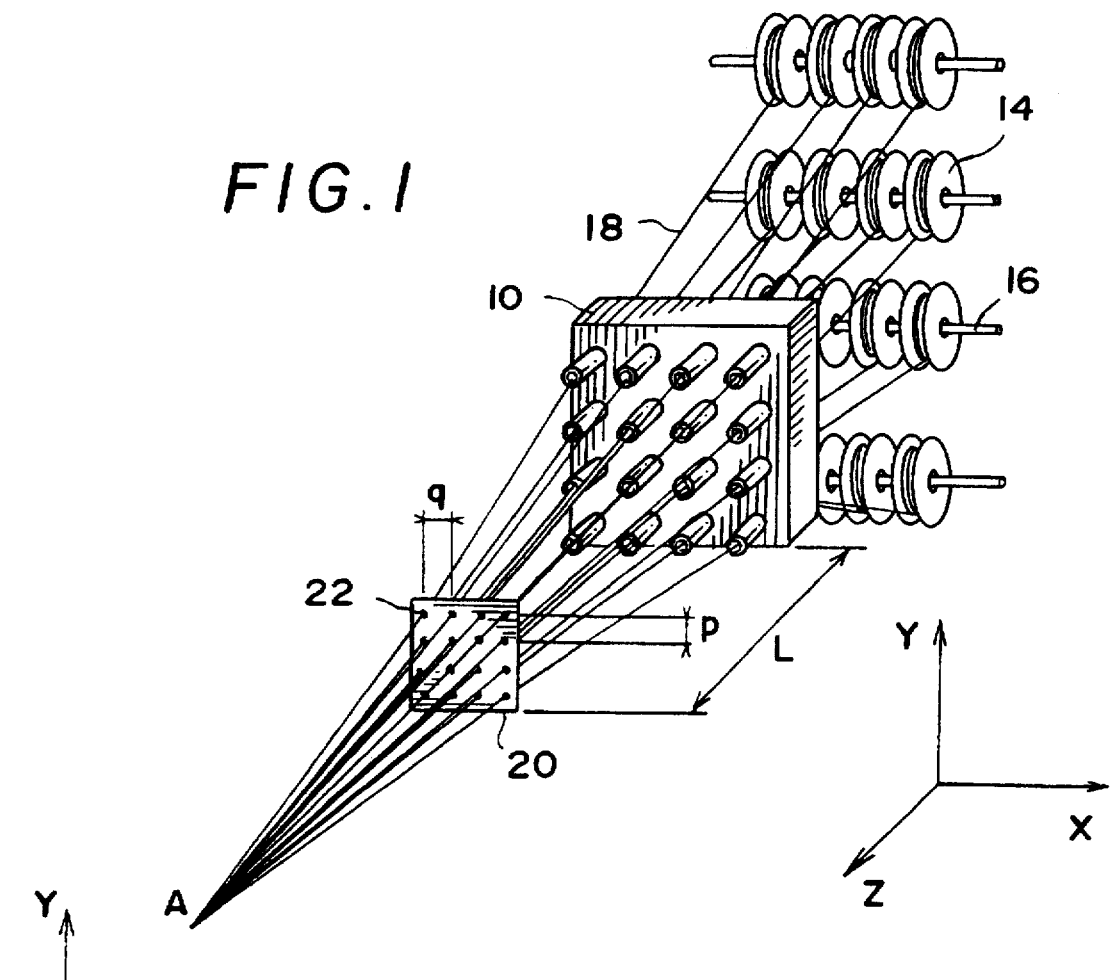
FIG. 1 is a fragmentary perspective view of the machine showing the means for holding the bundle of fibers.

FIG. 1 shows the installation means for putting the bundle of fibers into place. This figure shows a plate 10 which is disposed parallel to the axes X and Y. The plate is pierced by holes in which weaving tubes such as 12 are engaged. The weaving tubes are cylindrical and have axes parallel to the Z direction. The tubes are disposed at a pitch q' in the X direction and a pitch p' in the Y direction. Behind the plate 10 there can be seen spools such as 14 which are mounted on shafts 16. The spools 14 carry reinforcing fiber such as 18. Naturally, there are as many spools 14 as there are tubes 12. The keeper means likewise comprise a shaping plate 20 which constitutes the second end of the machine. This plate extends parallel to the directions X and Y, and thus parallel to the plate 10. The plate 20 is pierced by orifices 22, there being the same number of orifices as there are tubes 12. The orifices 22 are disposed at a pitch q in the X direction and a pitch p in the Y direction. The pitches p and q define the spacing of the Z direction fibers in the final reinforcing structure of the composite material. The two plates 20 and 10 are separated by a distance L. The pitch q is smaller than the pitch q' and the pitch p is smaller than the pitch p'. As can be seen in FIG. 1, each fiber 18 of the bundle passes though a tube 12 and through the corresponding orifice 22 of the shaping plate 20. The free ends of the set of fibers are held together at point A. It should also be specified that the spools 14 are associated with braking means (not shown) to ensure that the tension in the fibers 18 of the bundle is kept constant regardless of the external stresses applied thereto. The bundle of fibers 18 is thus in the form of a truncated pyramid, with the fibers being distributed in layers in the X direction and in the Y direction. The layers leave passages between them that taper going from the plate 10 towards the plate 20. It should also be specified that the fixing point A and the shaping plate 20 are used only during initial installation of the bundle of fibers in the Z direction. As explained in greater detail below, the role played initially by the plate 20, i.e. that of maintaining the pitch of the fibers, is subsequently played by the sheets of fibers that have been moved close together in the X and Y directions on being displaced along the length L to come into the proximity of the plate 20.

Figure 2:
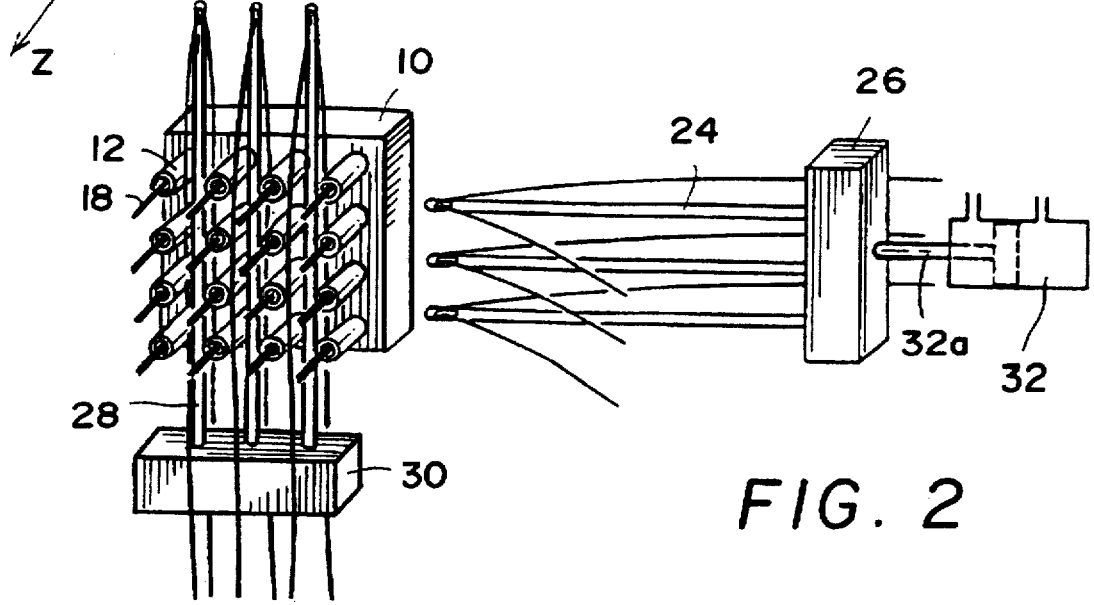
FIG. 2 shows a portion of the installation means enabling sheets of fibers to be put into place.

FIG. 2 shows a portion of the installation means enabling sheets of fibers to be put into place respectively in the X direction and in the Y direction, i.e. parallel to the tube plate 10. These means are constituted by needles such as 24 mounted on a needle carrier 26 for the Y direction and by needles 28 carried by a needle carrier 30 for the Y direction. The needles 24 can be displaced in the X direction, e.g. under drive from an actuator 32 whose rod 32a is secured to the needle carrier 26. The needles move in a plane parallel to the axes X and Y and are capable of passing between the rows of tubes 12 (for the needles 24) or between the columns of tubes 12 (for the needles 28). As already mentioned, the needles are guided in their translation motion by the tubes.

With reference more particularly to FIGS. 3 to 5, the way in which a plane sheet of fibers referenced 31 is initially put into place is described below, said fibers being parallel to the Y direction. For this purpose, the needles 28 are engaged between the tubes 12. Forks 34 including respective end prongs 36 and 38 carry the ends of combs 40. The ends of the combs 40 have curved notches 42 and 44 suitable for being freely engaged on the prongs 36 and 38. The combs 40 include as many notches 46 as there are Y direction fibers in the sheet. A comb 40 and its notches 46 serve to hold the fibers 31 after the needles 28 have passed through. FIG. 5 shows that to make the sheet of Y direction fibers 31, there are, naturally, two forks 34a and 34b disposed on opposite sides of the tube plate 10. In their initial positions, the forks 34a and 34b are naturally in the immediate proximity of the front face of the plate 10 since the needles 28 must pass between the tubes 12. Each fork 34a and 34b is associated with a respective comb 40a, 40b over which the fibers 31 pass to form a sheet parallel to the Y direction.

With reference now to FIGS. 6a to 6c, there follows a description of the displacement means for moving the sheet of fibers in the Y direction so that the fibers therein are moved closer together.

In these figures, only the forks 34a to 34d are shown, and their combs and associated sheets of fibers carried by the combs are omitted in order to facilitate comprehension. In an initial position, the forks 34a and 34b carrying the sheet of Y direction fibers are disposed in the immediate proximity of the plate 10. The forks 34a and 34b are displaced in the Z direction so that the sheet of fibers remains parallel to the X and Y directions. As shown in FIGS. 6b and 6c, the forks 34a and 34b are simultaneously displaced in the Z direction and rotated about their support axes 50a and 50b which axes themselves remain parallel to the Z direction. FIG. 6b shows the forks in an intermediate position after they have begun to rotate and FIG. 6c shows them in their final position, i.e. after they have moved through the length L to the proximity of the plate 20 if the sheet is the first sheet, or to the proximity of the preceding sheet to be pressed into place, otherwise. The total angle through which the forks 34a and 34b rotate is referenced a.

It will be understood that the angle a defines the extent to which the fibers in the sheet are moved towards one another and thus the ratio between the pitch p and p', and more particularly, p=p' cos a. Naturally the forks 34c and 34d are likewise associated with rotation about axes 50c and 50d. Each fork may be displaced by means of a motor 52 associated with a means for applying rotary drive about the axis 50, which system is given reference 54, thereby causing the forks 34 to rotate uniformly and synchronously with their displacement in the Z direction. As can be seen more clearly in FIG. 6, when the forks, e.g. 34a and 34b, reach their final position, their prongs, e.g. 36a and 36b, are in alignment with stationary rods 60 and 62 for the fork 34a, or 64 and 66 for the fork 34b. There are also two pairs of rods corresponding to the forks 34c and 34d. As explained in greater detail below, the combs 40 carried by the forks 34 are slid off the prongs 36 and 38 when the forks come to the end of their stroke and they thus pass onto the corresponding holding rods. In this way, the combs carried by the fork 34a are stacked successively on the rods 60 and 62 which thus constitute the equivalent of rails co-operating with the curved terminal portions 42 and 44 of the combs.

Figure 7A:
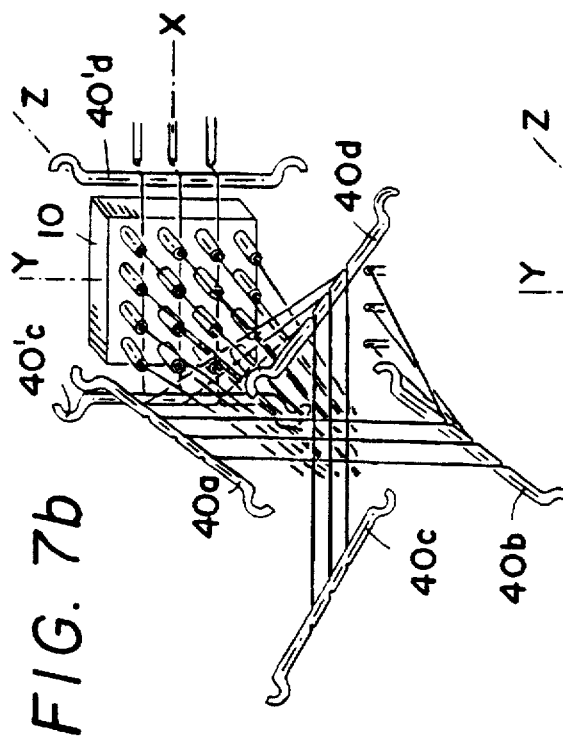
FIGS. 7a to 7d are perspective views in simplified form showing the successive positions of the support means and of the displacement means for the sheets of fibers.
Figure 7B:
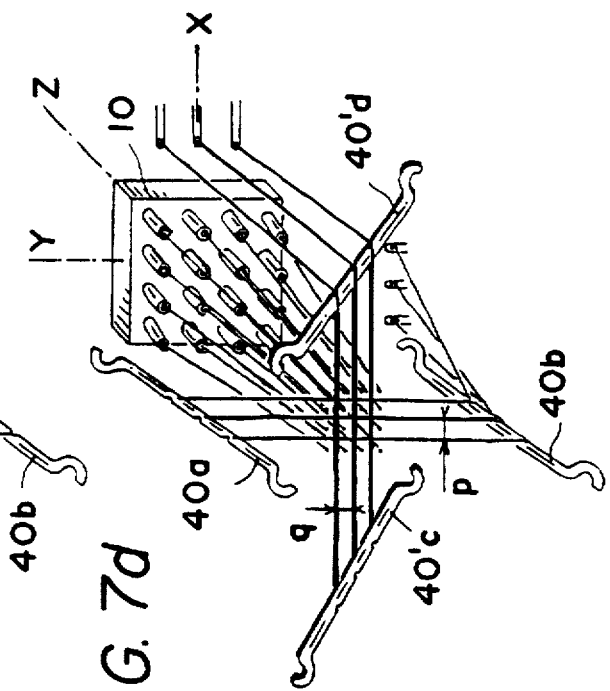
Figure 7C:
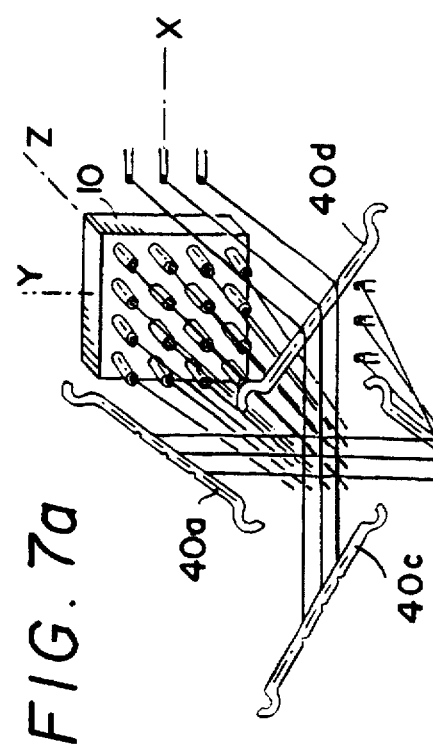
Figure 7D:
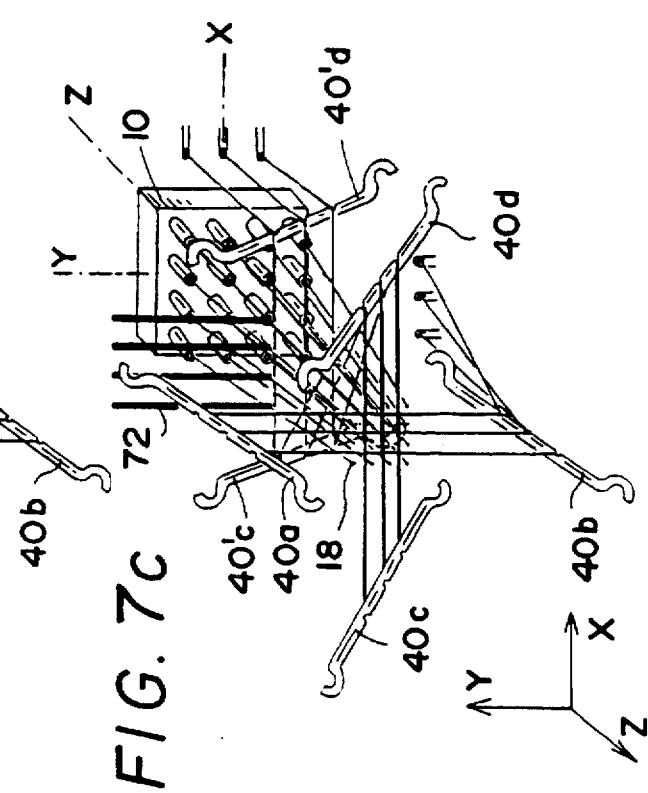

FIGS. 7a to 7d show how the fibers in the sheets are moved closer together by the effect of displacement with rotation of the forks and thus of the combs carrying the fibers. In FIG. 7a, there can be seen the combs 40a and 40b corresponding to a sheet in the Y direction together with the combs 40c and 40d corresponding to a sheet of fibers in the X direction, said combs having reached their final position, i.e. having performed the desired displacement of the fibers towards one another in the directions X and Y. The combs are supported by the rods 60 to 66 (not shown in the figure in order to simplify it). FIG. 7b shows a second pair of combs 40'c and 40'd in their starting position, i.e. in the proximity of the tube plate 10, which combs are carrying a new sheet of fibers 31 extending in the X direction. In FIG. 7c, the combs 40'c and 40'd can be seen in an intermediate position, i.e. the combs have begun to rotate, thereby beginning to move the fibers 31 of the sheet towards one another. In FIG. 7d, the combs 40'd and 40'c are shown in their final position, i.e. after they have completed their rotation. In this position, the spacing between the fibers 31 in the sheet is equal to q, i.e. to the distance that is desired in the composite material.

It should also be observed in FIG. 7c that an impregnating device 72 is shown diagrammatically, disposed in an intermediate position between the two end positions of the combs for the purpose of impregnating the sheet of fibers that is being displaced with an appropriate resin, thereby also impregnating the fibers in the bundle that extends along the Z direction.

Figure 8:
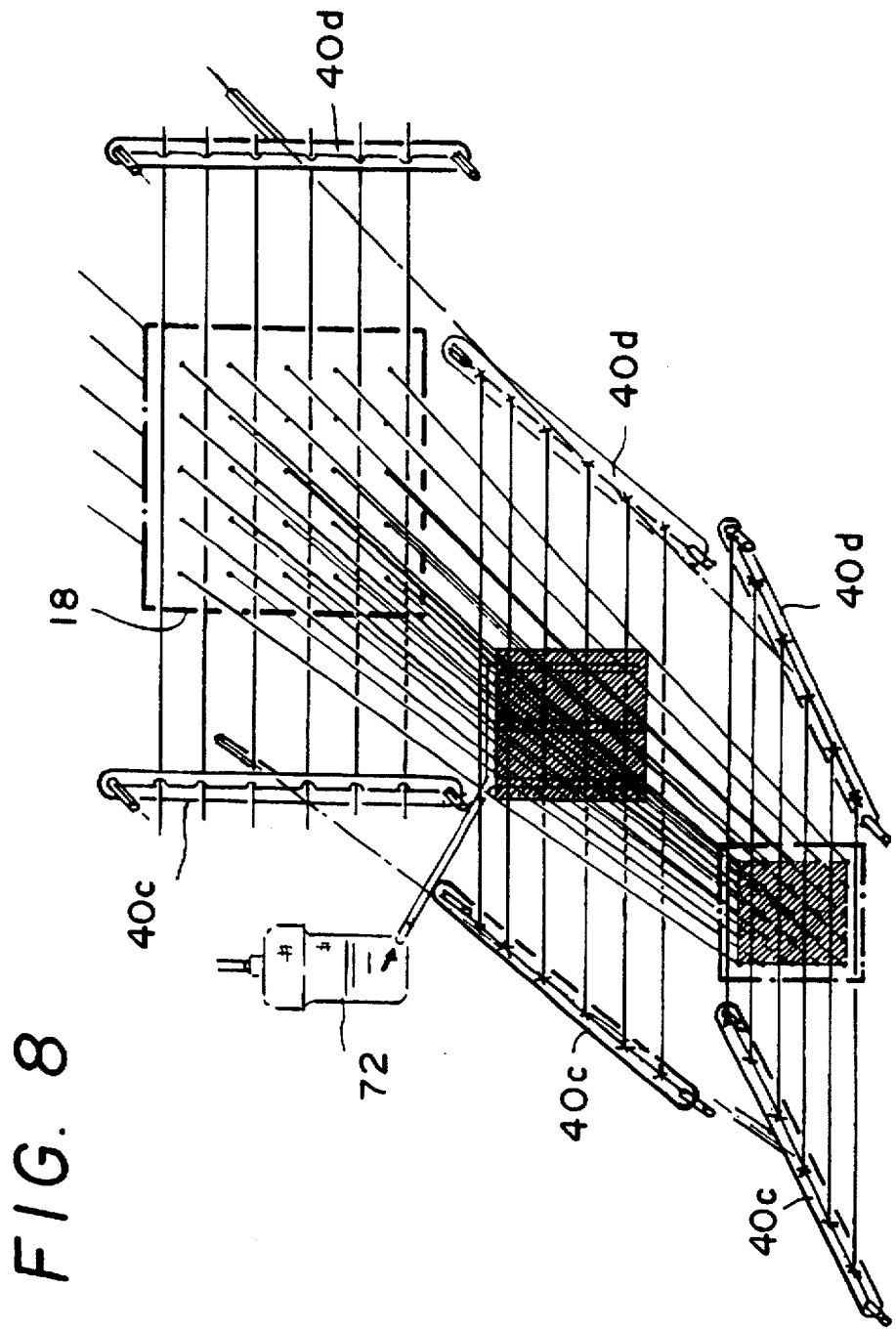
FIG. 8 shows the impregnation step and shows the different positions of the displacement means for displacing the sheets of fibers.

FIG. 8 is a perspective view showing the various positions taken up by the combs and the forks 34c, 40c, and 34b, 40b carrying a sheet of fibers parallel to the X direction. These forks are shown in their initial positions, in one of their intermediate positions, and in their final positions. In the intermediate position, there can also be seen the impregnating machine which impregnates both the fibers of the sheet and also the fibers in the bundle extending in the Z direction. Since this device is of a type that is known per se, there is no need to describe it in greater detail. To improve impregnation, provision may be made for the impregnating device to move along the directions X and Y over a short distance synchronously with the displacement of the sheet.

It may merely be observed that the resin forming the matrix of the material polymerizes while the alternate X direction and Y direction sheets arrive in their terminal positions on the rods.

Figure 9:
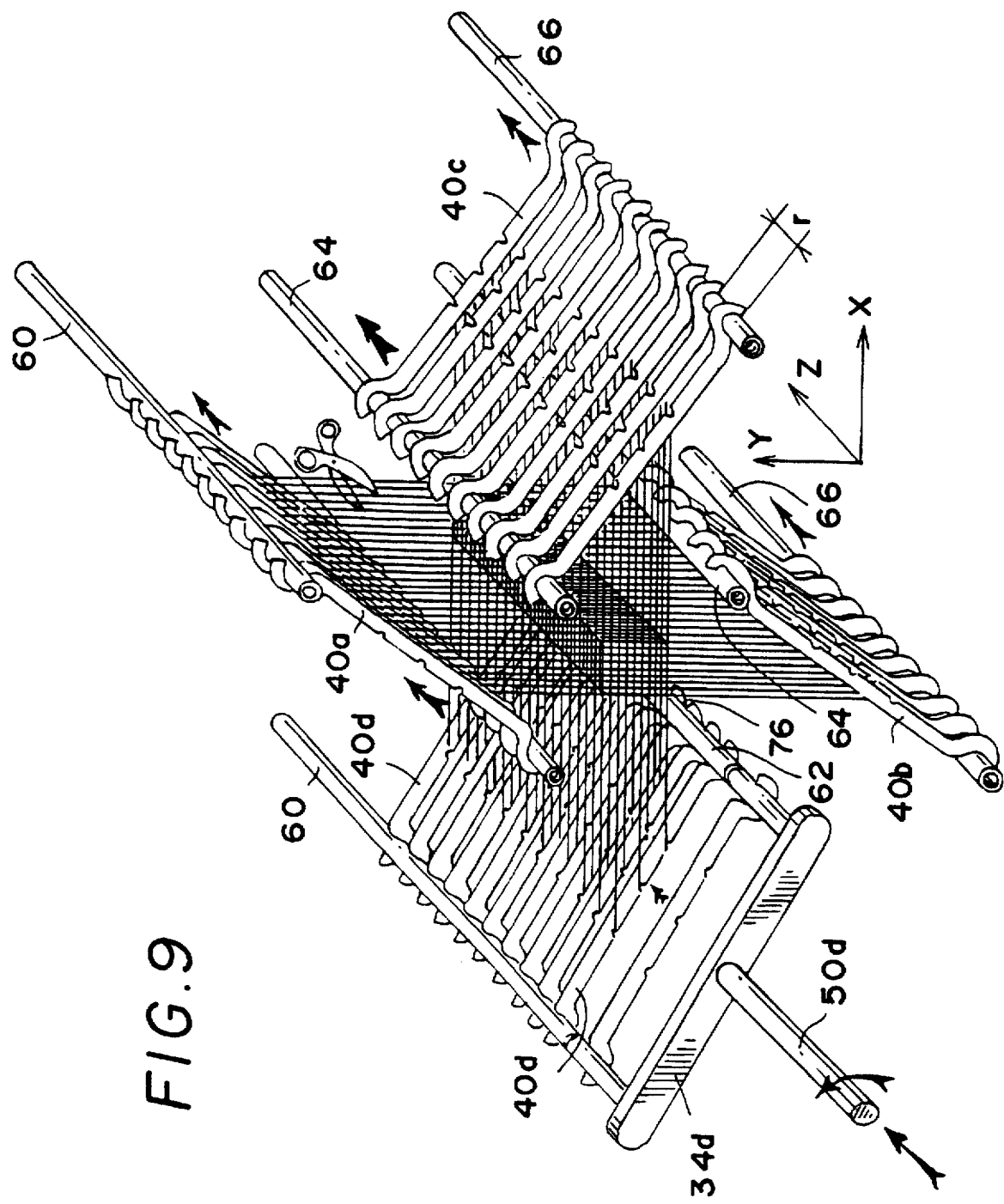
FIG. 9 shows the means for supporting and displacing the sheets of fibers into their final positions.

FIG. 9 is a perspective view showing all of the pairs of combs 40a & 40b and 40c & 40d that have been put into place on the rods 60, 62, 64, and 66 for the combs 40a and 40b, and on the parallel rods 60', 62', and 64', 66' for the combs 40c and 40d. To make this figure more readable, the direction of the Z axis revered relative to the direction in which it is shown in the other figures. This figure also shows the composite material 76 in the form of a bar which is being built up firstly by the fibers of the bundle in the Z direction and secondly by the successive sheets of fibers in the X and Y directions, all of the fibers being impregnated in the resin that forms the matrix of the composite material. The machine also includes a moving mechanism suitable for causing the combs in a pair of combs, e.g. 40d and 40c to slide simultaneously from the prongs of the forks supporting them, e.g. 34d and 34c, onto the corresponding rods, e.g. 60' & 62' and 64' & 66', and to cause these combs to slide over the corresponding pairs of rods until they take up an appropriate position. These mechanisms are described below with reference to FIG. 11. It is also mentioned with respect to the present figure that the distance between the combs resting on a given pair of rods, e.g. the rods 64' and 66' for the combs 40c, is accurately defined. This distance is equal to r. This result is obtained either directly because of the thickness in the Z direction of the combs themselves, or else by providing a system of suitable stops. It will thus be understood that in a plane perpendicular to the Z axis, the distance between fibers parallel to the X direction is equal to q, the distance between fibers parallel to the Y direction is equal to p, and the distance in the Z direction between the fibers parallel to the Y direction and between the fibers parallel to the X direction is equal to r. This is shown on a larger scale in FIG. 10.

Figure 11:
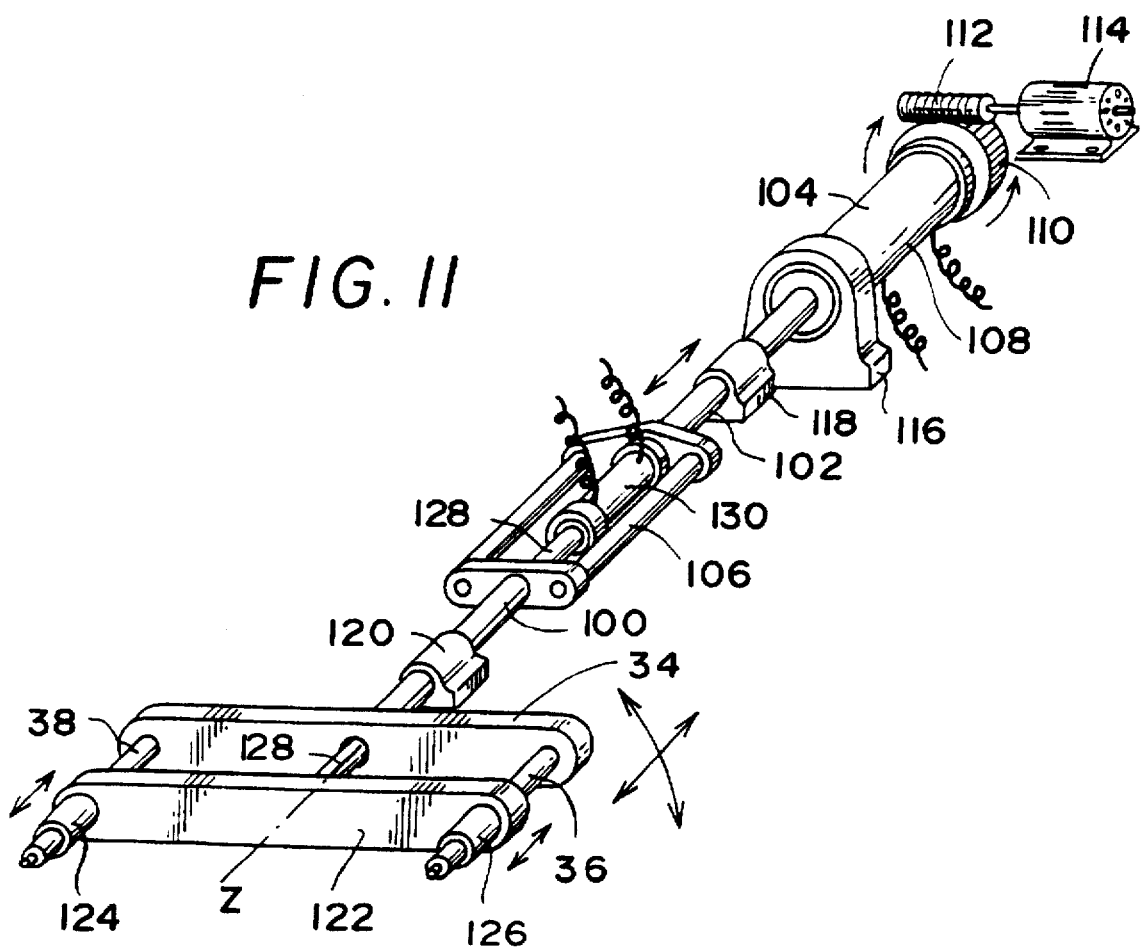
FIG. 11 shows a detailed embodiment of the displacement means for the support means.
Figure 12:
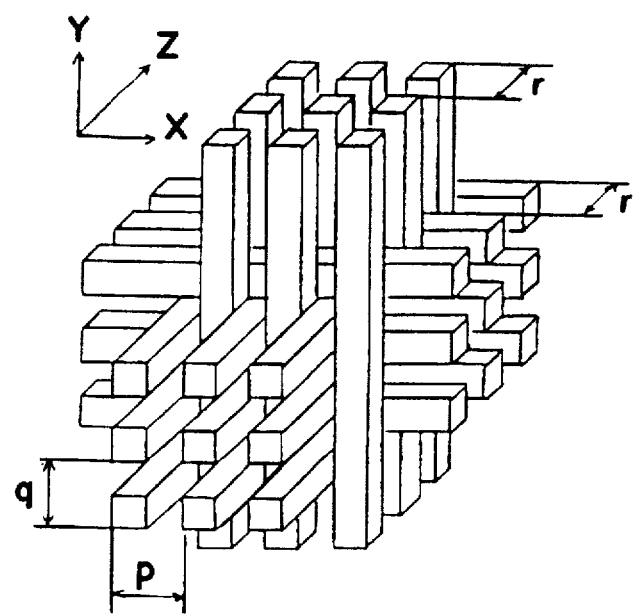
FIG. 12 is a perspective view of the reinforcing fiber structure that is obtained.

With reference now to FIG. 11, a preferred embodiment of the forks and of their displacement means is described below in detail. The fork 34 and its prongs 36 and 38 for receiving the ends of combs is mounted at the end of a rod 100 which is itself connected to the rod 102 of an actuator 104 via a bracket 106. The cylinder 108 of the actuator 104 includes a gear wheel 110 co-operating with a worm screw 112 mounted on the shaft of a motor 114. The actuator cylinder 108 is prevented from moving in translation, but is rotatable in a bearing 116. In addition, the rods 100 and 102 are free to move in translation and in rotation in bearings 118 and 120. Thus, by simultaneously actuating the motor 114 and the actuator 104, the fork 34 is caused to move in translation in the Z direction and also in rotation so as to move the fibers of a sheet towards one another.

The fork 34 is provided with a mechanism for enabling a comb (not shown) carried by its prongs 36 and 38 to be transferred onto the corresponding rods at the end of the stroke of the fork. A crossbar 122 provided with two sleeves 124 and 126 capable of sliding on the prongs 36 and 38 is mounted at the end of a rod 128. The rod 128 is mounted to slide inside the rod 100 which is hollow. The rod 128 constitutes the rod of an actuator 130 which is mounted inside the bracket 106. Thus, when the actuator 130 is actuated, the displacement of the sleeves 124 and 126 causes the comb to be transferred from the prongs 36 and 38 onto the stationary rods 60 to 66 and 60' to 66'.

When a new comb is put into place on the rods, the combs that had previously been placed thereon are simultaneously pushed back through a pitch r/2. This displacement applies to the entire piece made so far because the impregnating substance which has already been deposited on the sheets is in the process of polymerizing, as is shown more clearly in FIG. 9, where the piece of composite material is in the process of hardening. It will also be understood that because of these successive backwards steps, it is possible to make a continuous piece 76 of composite material. The length of the rods supporting the combs does not constitute a limit since as the impregnation material hardens, the corresponding combs can be removed from the rods, since the positions of the fibers in the sheets have become frozen.

Furthermore, because of the successive backwards steps, the truncated pyramid constituted by the bundle 18 of fibers remains generally unchanged, with the successive backwards steps of pitch r/2 being compensated by a corresponding amount of fiber carried by the spools 14 being paid out.

In a preferred embodiment of the machine, the tube plate is square, the tubes 12 are 20 mm long in the Z direction, they have an inside diameter of 1.5 mm, and an outside diameter of 2.5 mm. The pitches p' and q' are equal and have a value of 5 mm, thereby leaving gaps of 3 mm between adjacent tubes which are large enough to enable the needles 28 to pass between the rows and the columns of tubes, while simultaneously guiding the needles over their entire travel through the bundle. The plate 10 has 400 tubes 12 made of stainless steel. In addition, the angle of rotation a of the forks is selected to lie in the range 60° to 75°, thereby enabling a ratio between p' and p or between q' and q to be achieved that lies in the range 2 to 3.3. Under certain circumstances, it may be advantageous to have different ratios in the X direction and in the Y direction.

Three examples of implementations of the method of the invention using the above-described machine are described below.

EXAMPLE 1

Making an epoxy-aramid cube.

Materials used:

Kevlar roving or fiber made by Du Pont and weighing 0.789 grams per meter (g/m) for the Z axis;

Kevlar roving or fiber made by Du Pont and weighing 0.310 g/m for the X and Y axes;

LY-556 resin with 10 parts per 100 of HY-951 hardener as made by Ciba (cold polymerizing).

To facilitate impregnation and to increase the quality of the fiber-matrix interface, the roving or fibers are subjected to treatment as described in French patent No. 84 14 800 of Sep. 26, 1984 and entitled: [in translation] "A method of preparing composite materials by electrostatic plasma, and products obtained thereby".

The bundle of fibers uses only 196 (14×14) of the 400 tubes in the plate 10, and the combs have a thickness of 1 mm. After polymerization at ambient temperature, rough cutting to remove the three-dimensional piece from the machine, and postbaking in an oven to complete polymerization, the cube was cut out using a milling machine, and its faces were polished for microscopic examination. The dimensions of the cube were 25 mm by 24 mm by 22 mm and it weighed 17.83 g. Along the three axes it contained respectively 3.90 m, 4.00 m, and 4.06 m of Kevlar, i.e. 3.08 g in the Z direction, 2.52 g in the X direction, and 2.56 g in the Y direction, with the roving in the X and in the Y direction being double. The reinforcement was distributed as follows: 38% for Z, 31% for X, and 31% for Y. The concentration of reinforcement by weight was 45%. Given the densities of the resin and of the reinforcing material, the concentration of the reinforcement per unit volume of the cube was calculated as being equal to 41%, with porosity of less than 3%.

EXAMPLE 2

Making a bar of filled glass-epoxy composite.

Materials used:

E glass roving from Vetrotex, ref. P 185 having a weight of 2.400 Tex (2.4 g/m);

same roving but having a weight of 1.200Tex (1.2 g/m).

Whether single (2.400 Tex) or doubled for the X and Y axes, the above glass roving is relatively coarse: having a cross-section of 0.945 mm$^2$. Theoretical calculation indicates that to obtain an overall concentration of reinforcement per unit volume of 50% would require a pitch of 2.5 mm using combs having a thickness of 1.5 mm spaced apart by stops that are 1 mm thick. The angle of rotation was chosen to be equal to 62°, thus giving an X pitch and a Y pitch of 2.35 mm.

The rovings were likewise treated by electrostatic plasma in accordance with patent No. 84 14 800 as in the first example.

All 400 tubes were used and 400 combs were installed.

The resin was the same as that used in Example 1, plus an additional 3 % of silica gel to prevent it flowing out from the composite block before hardening, but without spoiling the quality of impregnation.

After hardening, rough cutting out, baking in an oven to complete polymerization, and fine cutting using a milling machine and selecting cutting planes between layers, a block was obtained measuring 212 mm by 45 mm by 45mm, and weighing 787.3 g.

In the X and Y directions there were 19 rovings and in the Z direction there were 84 layers (85 on the adjacent surface).

Distribution was as follows:

numbers of rovings:

Z axis: 19×19–X axis: 84×19–Y axis: 84–19;

for an edge length of:

Z axis: 212 mm–X axis: 45 mm –Y axis: 45 mm;

length of glass:

Z axis: 76.53 m–X axis: 71.82 m–Y axis: 71.82 m.

Giving rise to a total length of glass of 220.17m, i.e. a distribution as follows:

Z axis: 34.8%–X axis: 32.6%–Y axis: 32.6% .

In the X and Y directions, the roving is double (1,200 Tex×2=2,400 Tex), except where it is flush with the surface where only one roving is used. The above length of glass corresponds to a mass of 527 g and to a volume of 207 cm$^3$, assuming that the density of the glass is 2.54 g/cm$^3$. The mass concentration of glass in the composite was 66.9%, and its volume concentration 48.3% .

EXAMPLE 3

This example relates to making a hybrid carbon aramid on epoxy resin bar in which the volume concentration of fibers is high (maximum packing density).

Substances used:

same resin formulation as for Example 2;

Kevlar 49 aramid roving from Du Pont weighing 0.3 g/m (2,800 deniers);

AS4 carbon roving comprising 12,000 Hercules filaments and weighing 0.90g/m . 800 combs having a thickness of 1 mm were used without stops.

The extent to which the combs were pressed together was limited by the thickness of the Kevlar fibers. The combs had only 15 notches, thereby limiting the number of usable tubes to 196 tubes which were provided with carbon in the Z direction.

After preparation identical to that of the two above examples, a bar was obtained having the dimensions 200 mm by 20 mm by 20 mm (after its faces had been milled).

On the basis of the number of rovings coming flush with the surface, the following pitches were calculated:

Z: 1.25 mm (60 rovings)

X: 1.5 mm (13 rovings)

Y: 1.5 mm (13 rovings).

The masses of the fibers were derived as follows:

Z: 13×13×0.2 m×0.90 g/m=30.4 g (carbon)

X: 13×160×0.2 m×0.31 g/m×2=25.8 g (Kevlar)

Y: identical to X=25.8 g (Kevlar).

On the basis of the above masses and on the respective densities of the reinforcing materials, the following fiber volumes can be calculated:

Z: 17.1 cm$^3$ –X: 17.3 cm$^3$ –Y: 17.3 cm$^3$ giving a total reinforcement volume of 51.7 cm$^3$.

Since the volume of the bar was 20 cm by 2 cm by 2 cm=80 cm$^3$, the volume concentration of reinforcement was 64.5% . Reinforcement volume is practically uniformly distributed over all three axes.

In the above description, a three-dimensional structure is described in detail having fibers extending along the directions X, Y, and Z, where Z is orthogonal to the directions X and Y and where the directions X and Y are orthogonal to each other. Naturally, the directions X and Y need not necessarily be orthogonal. It is also possible without going beyond the ambit of the invention for three distinct sheet directions to be provided in planes perpendicular to the Z direction instead of only two such directions X and Y. Thus, for example, a hexagonal pattern could be obtained in said planes instead of obtaining a square or rectangular pattern. It would then be necessary to provide three pairs of combs, three pairs of forks, and six pairs of supporting rods.

In the above description, the term "fiber" has been used as a general rule in order to simplify the description. Naturally, each fiber could be constituted by a plurality of filaments in the form of roving or possibly in the form of small cords.

We claim:

1. A method of fabricating a composite material having a three-dimensional structure of continuous reinforcing fibers, said fibers extending respectively along directions X, Y, and Z, where the direction Z is perpendicular to the directions X and Y, the method comprising the following steps of:

a) extending a bundle of fibers along the Z direction in such a manner that in a first plane parallel to the directions X and Y the fibers present pitches p' and q' between one another respectively in the X direction and the Y direction, and in a second plane also parallel to the X and Y directions and at a distance L from said first plane, they present pitches $p$ and $q$ respectively in the X direction and the Y direction that correspond to the desired reinforcing structure with $p<p'$ and $q<q'$, the fibers leaving passages between one and another in the X and Y directions, which passages taper from the first plane towards the second plane;

b) placing a substantially plane first sheet of fibers extending in the X direction parallel to the XY plane between the fibers of the bundle in the proximity of said first plane and occupying the X direction passages, the fibers of said sheet being spaced apart by a distance substantially equal to q', and all of said sheet is displaced over a distance L parallel to the Z direction towards said second plane while simultaneously progressively moving the fibers of said sheet towards one another in such a manner that at the end of said movement the spacing between the fibers of said sheet is substantially equal to q, and said spacing is held;

c) placing a substantially plane second sheet of fibers extending in the Y direction parallel to the XY plane between the fibers of the bundle in the proximity of said first plane and occupying the Y direction passages, the fibers of said sheet being spaced apart by a distance substantially equal to p', and all of said sheet is displaced over a distance L parallel to the Z direction towards said second plane while simultaneously progressively moving the fibers of the second sheet towards one another in such a manner that at the end of said movement the spacing between the fibers of the second sheet is substantially equal to p, said spacing is held, and the first sheet is displaced through a distance r/2 in the Z direction when the second sheet reaches the second plane; and d) repeating the operations b and c alternately for the first and second sheets of fibers until a desired length is obtained in the Z direction, with the displacement over the distance L towards said second end of a first or second sheet of fibers being accompanied by displacement through r/2 in the Z direction of all of the sheets that precede it; said method further including a step of impregnating the sheets and the bundle of fibers by means of a thermosettable liquid, thereby obtaining a composite material having reinforcing fibers at pitches $p$, $q$ and $r$.

2. A method according to claim 1, wherein the impregnating step consists in performing an impregnating operation on each first or second sheet of fibers while it is being displaced.

3. A method according to claim 1, wherein the X and Y directions are substantially mutually orthogonal.

4. A method according to claim 1, wherein the pitches $p$ and $q$ are equal to each other, as are the pitches p' and q'.

5. A method according to claim 3, wherein the pitches $p$ and $q$ are equal to each other, as are the pitches p' and q'.

6. A machine for fabricating a composite material having a three-dimensional structure of reinforcing fibers, said fibers extending respectively along directions X, Y, and Z where the directions X and Y are orthogonal to the direction Z, the machine comprising:

first keeper means and second keeper means disposed as a distance L from the first keeper means, the keeper means serving to hold a bundle of fibers having an axis in the Z direction, the first keeper means defining respective pitches p' and q' in the X and Y directions for the fibers of the bundle and the second keeper means defining pitches $p$ and $q$ in the directions X and Y for the fibers of the bundle, where p'>p and q'>q, passages existing in the X and Y directions between the fibers of the bundle;

a plurality of first support means for putting a sheet of fibers into place in the proximity of said first keeper means in the X direction, extending in a plane parallel to X and Y, the fibers being spaced apart by a distance substantially equal to q' and being disposed in the Y passages;

a plurality of second support means for installing second sheets of fibers in the proximity of said first keeper means, the fibers being disposed in the Y direction in a plane parallel to X and Y, the fibers being spaced apart by a distance substantially equal to p';

first displacement means for displacing said first support means over a distance L in the Z direction from said first keeper means and for simultaneously causing the fibers of said first sheets to move towards one another in such a manner that at the end of their displacement, the distance between the fibers in the Y direction is substantially equal to q, and holder means for holding the distances between the fibers of said first sheet equal to q;

second displacement means for displacing said second support means over a distance L in the Z direction from said first keeper means and for simultaneously causing the fibers of said second sheets to move towards one another in such a manner that at the end of their displacement, the distance between the fibers in the X direction is substantially equal to p, and holder means for holding the distances between the fibers of said second sheet equal to p;

control means for alternately actuating said first and second displacement means and means for displacing the already close together sheet support means along the Z direction through a distance r/2 whenever the first or second displacement means bring a first or a second sheet into the second plane; and impregnation means for impregnating said fibers by means of thermosetting liquid.

7. A machine according to claim 6, wherein the impregnation means are disposed between said first and second keeper means for successively impregnating each sheet during displacement thereof.

8. A machine according to claim 6, wherein said first keeper means comprise a plate parallel to the plane X, Y and provided with a plurality of cylindrical tubes having their axes extending along the Z direction, a bundle fiber passing through each tube, said tubes mutually disposed at the pitches p' and q'.

9. A machine according to claim 8, further comprising two sets of needles suitable for moving in the X direction and in the Y direction, respectively, to form said first and second sheets of fibers, respectively, said needles being suitable for passing between said tubes of said plate, said tubes being located in said X and Y directions.

10. A machine according to claim 6, wherein each support means comprises two comb-forming assemblies provided with notches for receiving the fibers forming a sheet.

11. A machine according to claim 10, wherein each displacement means comprises a pair of fork-forming assemblies each suitable for removably receiving one of said comb-forming assemblies, and means for synchronizing displacing said forks parallel to the Z direction while simultaneously causing each fork to rotate progressively about a Z direction axis while keeping the forks in any pair parallel to each other.

12. A machine according to claim 11, further comprising holding means disposed parallel to the Z direction and around said bundle of fibers in the proximity of said second keeper means for supporting said combs when they have completed their displacement and their rotation under the drive of said displacement means, and for holding them in said position until the impregnation liquid has hardened, at least in part.

13. A machine according to claim 12, wherein said holding means comprise four pairs of rods disposed parallel to the Z direction, each pair of rods being suitable for receiving the ends of a comb in its final orientation as defined by said displacement means.

14. A machine according to claim 13, further comprising means for defining the distance $\underline{r}$ between successive combs supported by the same pair of rods.

15. A machine according to claim 13, wherein the arrival of the combs associated with a new sheet cause the set of sheets whose combs have already been installed on said pairs of rods to be pushed back through a distance $r/2$.

16. A machine according to claim 8, wherein each support means comprises two comb-forming assemblies provided with notches for receiving the fibers forming a sheet.

17. A machine according to claim 13, wherein the arrival of the combs associated with a new sheet cause the set of sheets whose combs have already been installed on said pairs of rods to be pushed back through a distance $r/2$.

* * * * *